US005767897A

United States Patent [19]
Howell

[11] Patent Number: 5,767,897
[45] Date of Patent: Jun. 16, 1998

[54] VIDEO CONFERENCING SYSTEM

[75] Inventor: Brian A. Howell, Marblehead, Mass.

[73] Assignee: PictureTel Corporation, Danvers, Mass.

[21] Appl. No.: 332,097

[22] Filed: Oct. 31, 1994

[51] Int. Cl.$^6$ .................................................. H04N 7/15
[52] U.S. Cl. ..................... 348/15; 379/93.21; 379/93.19
[58] Field of Search ........................... 348/15, 14, 16, 348/17, 18, 19; 379/96, 93.17, 93.19, 93.21; 370/62; 395/330; 345/1, 127, 130

[56] References Cited

U.S. PATENT DOCUMENTS

| | | | |
|---|---|---|---|
| 4,516,156 | 5/1985 | Fabris et al. | 348/15 |
| 4,876,657 | 10/1989 | Saito et al. | 364/521 |
| 5,206,721 | 4/1993 | Ashida et al. | 348/15 |
| 5,307,055 | 4/1994 | Baskin et al. | 345/1 |
| 5,385,475 | 1/1995 | Sudman et al. | 395/154 |
| 5,473,744 | 12/1995 | Allen et al. | 395/154 |
| 5,502,727 | 3/1996 | Catanzaro et al. | 348/14 |
| 5,583,565 | 12/1996 | Cortjens et al. | 348/15 |
| 5,596,346 | 1/1997 | Leone et al. | 345/127 |
| 5,627,825 | 5/1997 | Barraclough et al. | 348/15 |

OTHER PUBLICATIONS

McClain, Linda, Matrox Studio, "The Ultimate Desktop Video Production Suite".
Matrox Studio, "Plug This Into Your PC for the Most Successful Presentation of Your Life" 1993.
Matrox Studio, "The Ultimate Desktop Video Production Suite", Apr. 1993.

*Primary Examiner*—Stella Woo
*Attorney, Agent, or Firm*—Fish & Richardson P.C.

[57] ABSTRACT

A video conferencing system wherein a director controller is adapted for disposition on a lecture podium. The controller includes an interconnected control section and a video display section for controlling the distribution of generated audio and video information signals among a local and remote sites selectively in accordance with command signals fed to the controller by a podium speaker. The system is adapted to operate in one of two operating modes: a "Main-screen" mode and a "Mark-up" mode. In the "Main-screen" mode, the video display section is made up of two display areas; a "presentation" display area, and a "preview" display area. The "presentation" display area displays the video information which typically is currently being viewed by the audience/participants at the remote and local sites. The "preview" video display area is privately viewable by the podium speaker, displays video information signals from a second podium speaker selected one of the video sources. In the "Mark-up" mode, the "preview" area is removed and the size of the "presentation" area is increased. The image in the enlarged "presentation" area is adapted for editing/annotation by the podium speaker. The edited/annotated image is distributed to the local and remote sites.

67 Claims, 5 Drawing Sheets

VIDEO CONFERENCING SYSTEM

BACKGROUND OF THE INVENTION

This invention relates generally to video conferencing systems and more particularly to director controllers used in such systems.

As is known in the art, video conferencing systems are being used in a wide variety of settings to enable effective communication among audience/participants at local and remote sites. The local and remote site each have a video camera, a video monitor, a loudspeaker and a microphone. A director controller is typically at the local site to enable a director to control the distribution of the audio and video information signals produced at the sites for viewing and listening by the audience/participants at the other sites. For example, a director selects the site which is to transmit the video information signals to the other sites. One such setting is a classroom or meeting room where an instructor or moderator, (i.e., a "presenter") presents information to the local and remote sites. In order to maximize the effectiveness of the presenter, it is desirable that he/she also act as the director. Thus, it is desirable to have a user friendly, director controller.

SUMMARY OF THE INVENTION

In accordance with the present invention a video conferencing system is provided wherein a director controller is adapted for disposition on a lecture podium. The controller includes an interconnected control section and a video display section for controlling the distribution of generated audio and video information signals among a local and remote sites selectively in accordance with command signals fed to the controller by a director, typically the presenter. The system is adapted to operate in one of two operating modes: a "Main-screen" mode and a "Mark-up" mode.

In the "Main-screen" mode, the video display section is made up of two display areas; a "presentation" display area, and a "preview" display area. The "presentation" display area displays the video information which is currently being viewed by the audience/participants at the remote and local sites. The "preview" video display area is privately viewable by the presenting director, (i.e., podium speaker), and displays video information signals from a second podium speaker selected one of the video sources. The video information for the "preview" and "presentation" areas is generated by one of a number of video sources, including video cameras at the remote and local sites, a slide projector, a videotape recorder (VCR), a document camera, computer images and the like, selected by the podium speaker. The "presentation" and "preview" areas are disposed in side-by-side relationship. A tactile actuatable switch is disposed on the display section between the "preview" and "presentation" areas clearly indicating to the podium speaker that touching such switch will transfer the video source used for the "preview" area to the "presentation" area and, therefore, the "preview" video becomes the video source distributed to the local and remote sites.

In the "Mark-up" mode, the "preview" area is removed and the size of the "presentation" area is increased. The image in the enlarged "presentation" area is adapted for editing or annotation by the podium speaker. The edited/annotated image is distributed to the local and remote sites. That is, the "presentation" area includes a tactile actuatable editing/annotating sensor, responsive to tactile contact with the image presented in the "presentation" area, for editing and/or annotating such video information and distributing the edited/annotated information to the video monitors at the remote and local sites.

With the arrangement, a more effective, more user friendly video conferencing system is provided.

In accordance with another feature of the invention, icons, each representing one of the video sources, are disposed in the display section for easy actuation by the podium speaker to select the video source for the "presentation" area and "preview" areas.

In accordance with still another feature of the invention, a plurality of site selection options are available to the podium speaker, including: a "round robin" mode and a "site select" mode. In the "round robin" mode, the controller selects the video site to present for private viewing by the podium speaker by jumping from the video camera at one site to the video camera at another site, and so forth, in a "round robin" fashion. In the "site select" mode, the controller uses the camera at a site selected by the podium speaker. With another site selection option, the controller uses the video conferencing system bridge, which can respond to audio signals produced by the microphones at the local and remote sites, to select one of the video signals produced by the video camera at the sites for presentation on the video monitors at the other sites during a "teach/direct" mode. Thus, the bridge, in response to the audio signals produced by the microphones at the remote sites, can be directed to select the video signal from such site at which the last speaker spoke, or is speaking, for distribution to the local and remote sites during the "director/teach" command mode. In this way, the podium speaker can view responses from the audience/participants at the sites and thereby better gage his/her presentation to their viewed responses.

In accordance with yet another feature of the invention, the video display section of the controller includes a tactile actuatable, zoom control, responsive to podium speaker tactile identification of a portion of the video information signals displayed on the "presentation" display area, for commanding the camera used as the video source for such information to zoom in on the selected identified portion.

In accordance with another feature of the invention, the "presentation" area is adapted to have displayed, in a sub-region thereof, an image of the podium speaker. The "presentation" area, together with the sub-region, is distributed, in picture-in-picture format, to the remote and local sites. This feature is also actuatable by the podium speaker interacting with a suitable icon. With such an arrangement, the podium speaker is able to maintain contact with the audience when presenting the material in the "presentation" area.

Figure 5A:
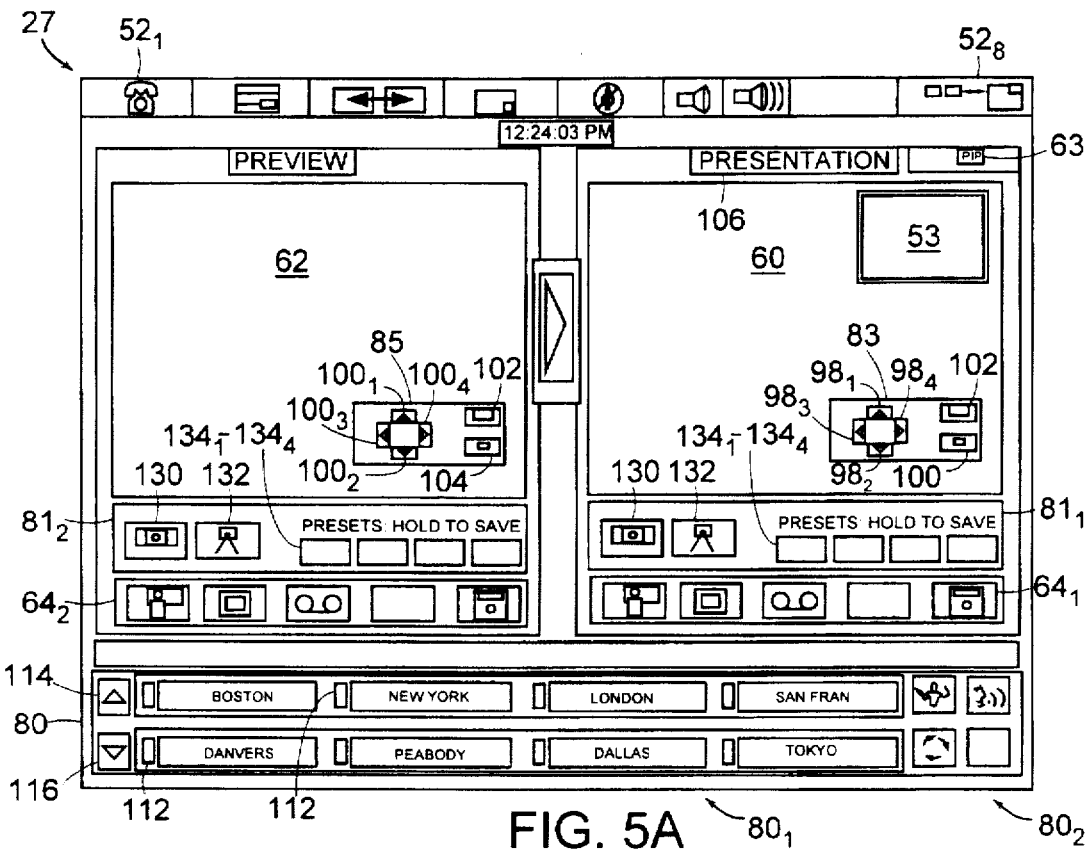
FIG. 5A showing the video controls when in an "instructor/presenter"
Figure 5B:
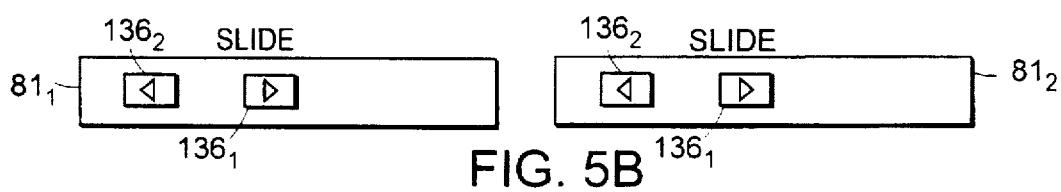
Figure 5C:
Figure 5D:
Figure 5E:
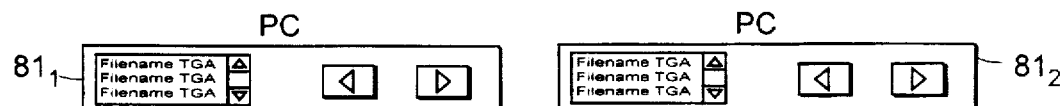

mode is selected, FIG. 5B showing the video controls when a slide projector camera is selected, FIG. 5C showing the controls when a VCR is selected, FIG. 5D showing the controls when a document camera is selected and FIG. 5E showing the controls when a PC storage device is selected.

DESCRIPTION OF THE PREFERRED EMBODIMENTS

Figure 1:
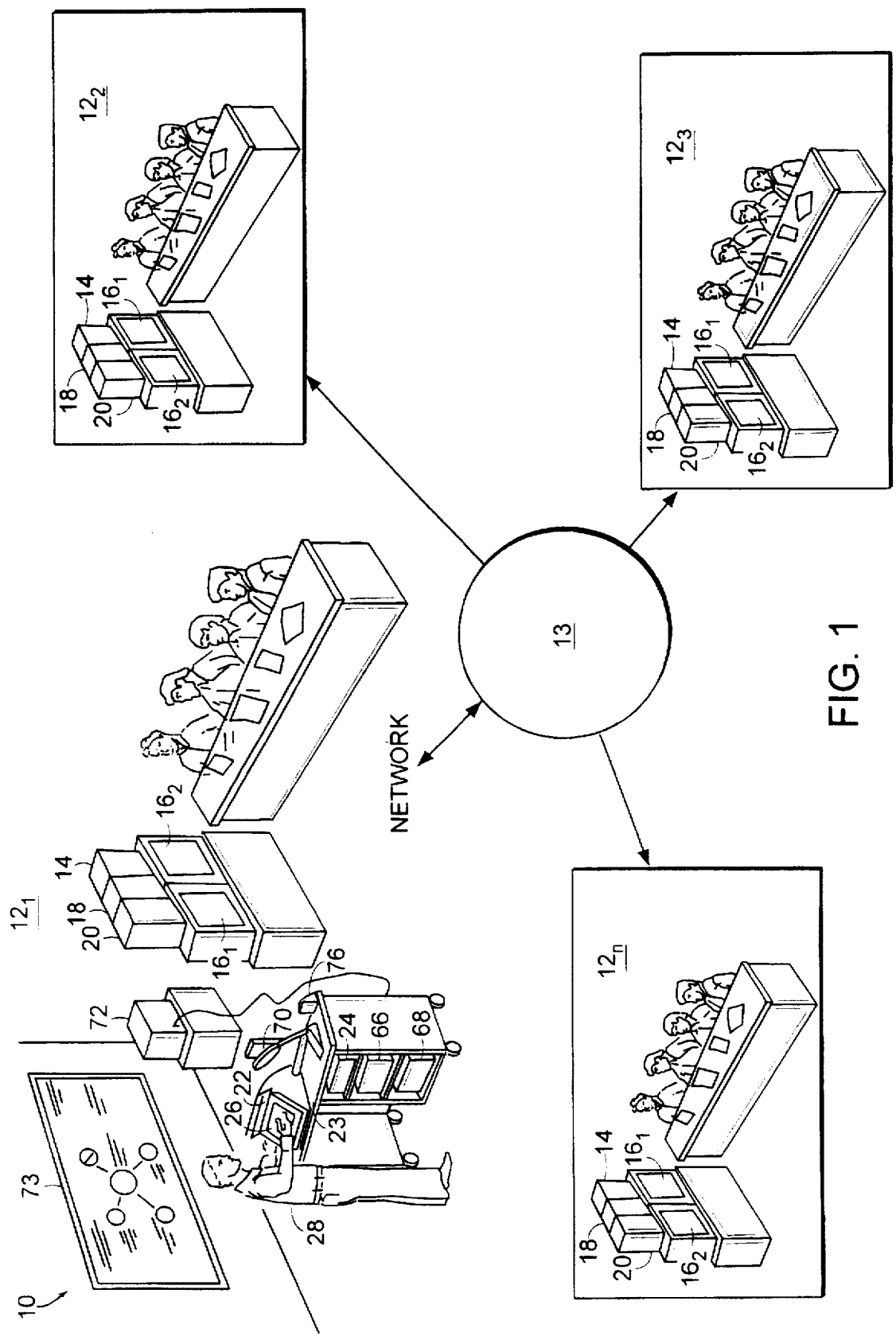
FIG. 1 is a diagram of a multi-point video conferencing system according to the invention.

Referring now to FIG. 1, a video conferencing system 10 is shown wherein a local, or near end, site $12_1$ is networked with a plurality of remote, or far end, sites $12_2-12_n$ to interchange audio and video information signals via bridge 13, here a PictureTel M-8000 bridge made by PictureTel Corporation, Danvers, Mass. The local, or near end, site $12_1$ and the plurality of remote, or far end, sites $12_2-12_n$ each have a video camera 14, a video monitor section 16, a loudspeaker 18 and a microphone 20. The local site $12_1$ has a director controller 22 disposed on a podium 23. (Here, a two monitor arrangement is used. Thus, the monitor 16 has two monitors $16_1$, $16_2$. At local site $12_1$, monitor $16_1$ displays the output from the video camera 14 at a selected one of the far end sites $12_2-12_n$ and monitor $16_2$ displays the outgoing video signal from the local site $12_1$ to the remote sites $12_2-12_n$. At the far end sites $12_2-12_n$, monitor $16_1$ displays the presentation shown to the local site $12_1$ on its monitor $16_2$ and monitor $16_2$ displays the video sent by that remote site. Monitor $16_2$ is a graphics monitor providing double resolution for displaying graphics, to be described, or the video presentation described above. It should be understood, however, that monitor section 16 may have, alternatively, a single monitor for both non-graphic and graphic images.

Figure 2:
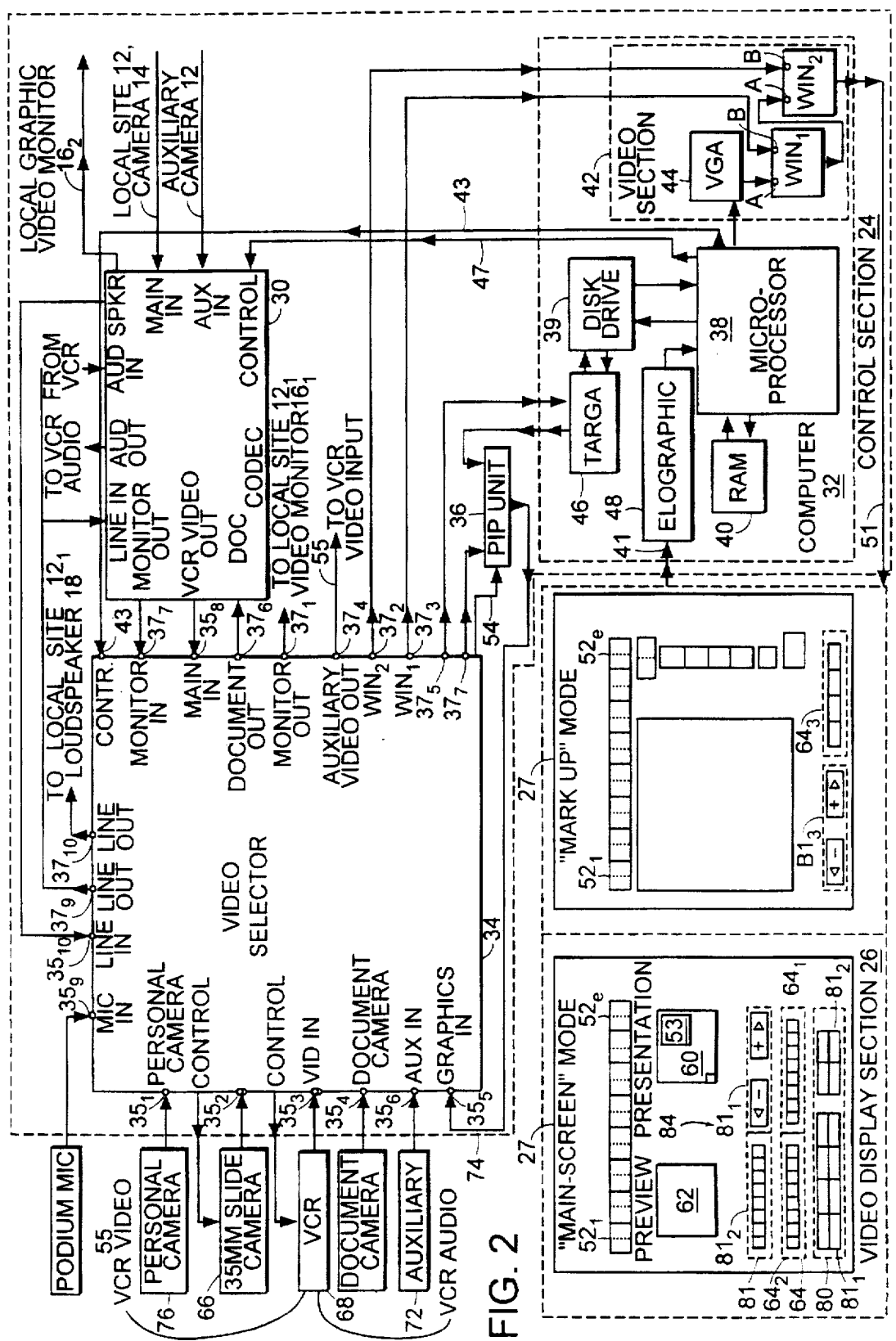
FIG. 2 is a block diagram of a control section used in the video conferencing system of FIG. 1.

Referring now also to FIG. 2, the director controller 22 includes an interconnected control section 24 and a video display section 26 arranged to control the distribution of generated audio and video information signals among the sites $12_1-12_n$ selectively in accordance with command signals fed to the control section 24 by a teacher, moderator, or lecturer, hereinafter sometimes referred to as a podium speaker 28 (FIG. 1). The control section 24 includes a PictureTel Model S-4000 video conferencing interface, or CODEC 30, a computer (PC) 32 that contains several video cards, to be described, a video selector 34, and a picture in picture (PIP) unit 36. Thus, here, director controller 22 is adapted to use any existing PictureTel Model 4000 teleconferencing interface.

Computer 32 is, here, implemented using a personal computer, having: a 386 microprocessor 38 adapted to operate at a speed of 33 MHz; 8 megabyte of main RAM memory 40; an 80 megabyte disk storage hard drive 39; and a 3.25 inch floppy drive, not shown. The computer 32 also has a video section 42 which includes two video capture/display cards, here WIN-TV cards (here made by Hauppauge Computer Works, Inc., 91 Cabot Court, Hauppauge, N.Y. 11788) WIN-1, WIN-2 cards, and a VGA graphics card 44. Each of the WIN-1, WIN-2 cards has a pair of input ports A, B. Input port A is a VGA signal input port and input port B is a video signal input port. Each one of the WIN-1, WIN-2 cards produces a VGA signal at its output. A Targa.16 graphics card 46, here made by True Vision, Inc., 7340 Shadeland Station, Indianapolis, Ind. 46256, is included for capturing (in a buffer memory, not shown, but included in the Targa.16 card 46) and overlaying annotation and/or editing video images during a "Mark-up" mode, as will be described in detail hereinafter. An Elographic card 48, here made by Elo Touch Systems (formally Elographic), 105 Randolph Rd., Oak Ridge, Tenn. 37830, is also included for producing control signals to the microprocessor 38 in response to touching by the podium speaker 28 of a touch screen display 27 of video display section 26.

The video selector 34 allows any of 8 video sources, to be described, coupled to input ports $35_1-35_8$, to be switched to any of eight possible outputs $37_1-37_8$ in response to a control signal fed thereto from microprocessor 38 via line 43, as will be described hereinafter. Suffice it to say here, however, that a selected one, or ones, of the eight video sources fed to input ports $35_1-35_8$ are coupled to a selected one, or ones, of the output ports $37_1-37_8$ of the selector 34 in response to touch commands from podium speaker 28/touch screen display 27 interaction.

Here, input port $35_1$ is coupled to a personal camera 76 directed at the podium speaker 28; input port $35_2$ is coupled to a 35 mm slide projector camera 66; input port $35_3$ is coupled to a VCR 68 via line 55; input port $35_4$ is coupled to a document camera 70; input port $35_5$ is coupled to the output of PIP unit 36; input port $35_6$ is coupled to an auxiliary video input source, here a video camera 72 directed to blackboard 73 (FIG. 1); input port $35_7$ is coupled to a selected video camera 14 at one of the far end sites $12_2-12_n$ via the monitor output port of the interface, or CODEC 30; and input port $35_8$ is coupled to the local video camera 14 at local site $12_1$ via the VCR output of the interface, or CODEC 30.

While the video selector 34 has provision for eight outputs at output ports $37_1-37_8$, here, only seven of such output ports $37_1-37_7$ are used. Output port $37_1$ is coupled to the monitor 16 insert at local site $12_1$; output port $37_2$ is coupled to the WIN1 card; output port $37_3$ is coupled to the WIN2 card; output port $37_4$ is coupled to video input of VCR 68; output port $37_5$ is coupled to an input of Targa.16 card 46; output port $37_6$ is coupled to the document camera input of interface, or CODEC 30; and, output port $37_7$ is coupled to one of the two input ports of the PIP unit 36.

Finally, it should be noted that while selector 30 has been referred to as a "video" selector, it also has a pair of audio input ports $35_9$, $35_{10}$ and a pair of audio output ports $37_9$, $39_{10}$. Audio input port $35_9$ is fed by the podium microphone, not shown, which picks up speech from the podium speaker 28. Audio input port $35_{10}$ is fed by the audio, or speaker (SPKR), output port of interface, or CODEC 30. Audio output port $37_{10}$ is fed to the loudspeaker 18 at the local site $12_1$; while audio output port $37_9$ is fed to the audio (or line) input of interface, or CODEC 30. Video selector 34, in response to control signals also fed to selector 34 from computer 32 via line 43 adjusts: the degree of mixing between the podium microphone output at port $35_9$ and the audio output from interface, or CODEC 30 at port $35_{10}$ to produce the audio signal at audio output port $37_9$ for distribution to the loudspeakers 18 at the remote sites $12_2-12_n$ via the audio input of interface, or CODEC 30; and, also the amount of audio fed from the podium microphone, not shown, via port $35_9$ to the audio output port $37_{10}$ for the local site $12_1$ loudspeaker 18.

The picture-in-picture (PIP) unit 36 receives any selected one video source of the eight video sources coupled to input ports $35_1-35_8$ of video selector 34 and output port $37_7$ at one of the pair of input ports of PIP unit 36, as noted above; and, a second one of the pair of input ports to PIP unit 36 is fed by the output of the Targa.16 graphic card 46, as shown. As noted above, the output of the PIP unit 36 is fed to input port $35_5$ of the video selector 34. On/off and PIP position control to the PIP unit 36 (i.e., whether the should be one picture, or a picture in picture (PIP); and, if a PIP, the position of the PIP) is supplied by the video selector 34 via line 54 in response to podium speaker 28 touch commands via the touch screen 27 to the elographic board 48, to be described. Here, output port $37_7$ is, typically, from a personal video camera 76 directed at the podium speaker 28 and fed to input port $35_1$. When in the PIP mode, the podium speaker 28 is presented in a sub-region 53 of the "presentation" display area 60, in the "Main-screen" mode and a region of the display area 60' (FIG. 4) in the "Mark-up" mode and the "preview" display area 62.

The video display section 26, here a touch screen VGA display 27, is driven by, and provides input to, the microprocessor 38 via elographic board 48. The touch screen display 27, here a 15 inch, touch screen monitor, is used to display video to the podium speaker 28 and to provide touch control input for the computer 32. (It should be noted that the video conferencing system 10 operates in one of two primary video display modes, to be described; i.e., a "Main-screen" mode and a "Mark-up" mode, each with a different display on the VGA display 27. FIG. 2 shows the display 27 in each mode, for convenience, it being understood that there is only one mode displayed on display 27 at any one time). The touch outputs from the display 26 are fed as inputs to the elographic board 48 within the computer 32 via line 41. Video source selection commands, input through the touch screen display 27 to the computer 32 via line 41, are used by the microprocessor 38 to provide a control signal to the video selector 34, via line 43, and to interface, or CODEC 30, via line 47. During the "Mark-up" mode, to be described, editing and/or annotation of the image in display 27 may be performed by a graphic pen, not shown, or the finger of the podium speaker 28.

Figure 3:
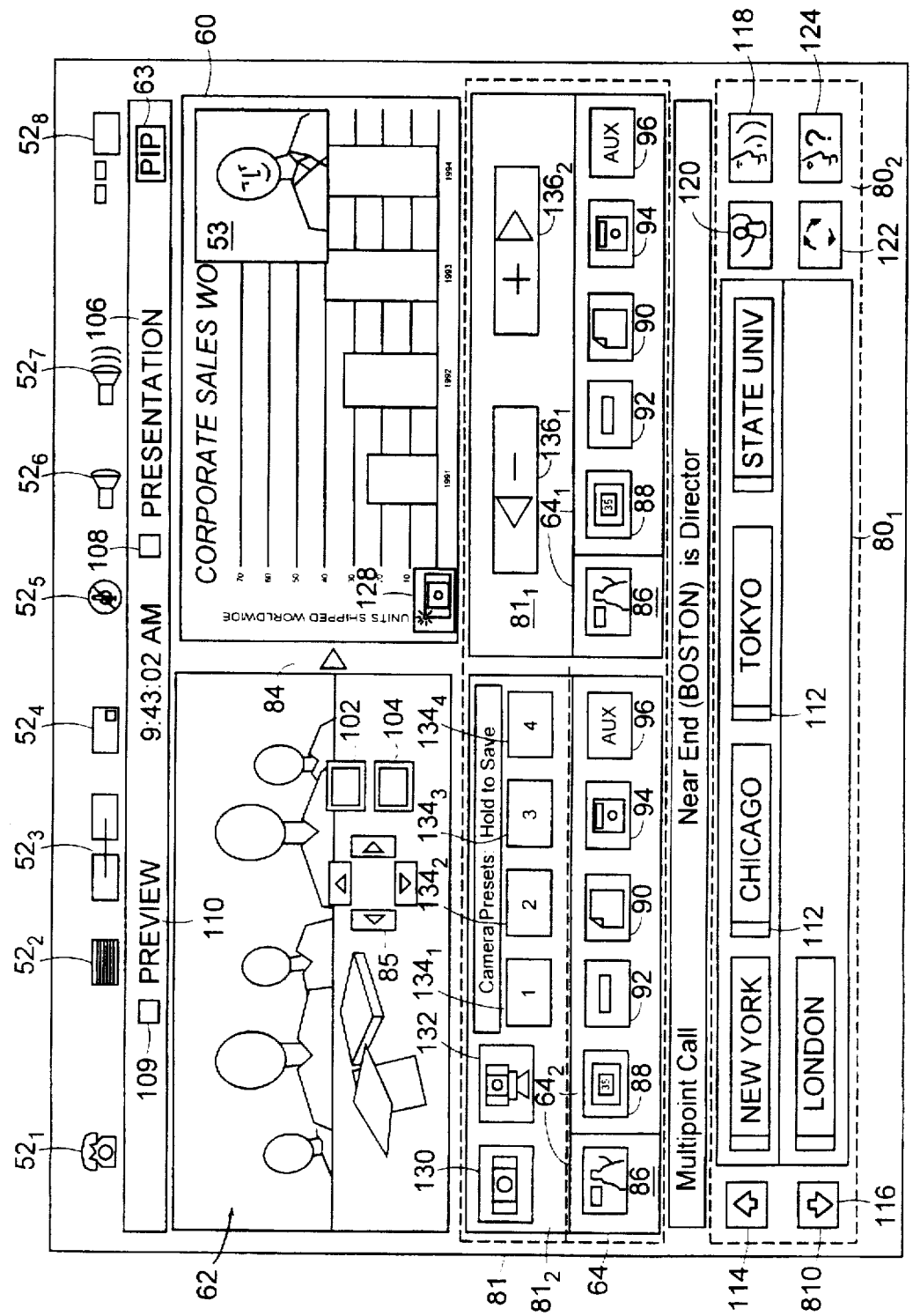
FIG. 3 is an illustrative view of a display screen used in the control section of FIG. 2 when the video conferencing system of FIG. 1 is operating in a "Main-screen" mode.
Figure 4:
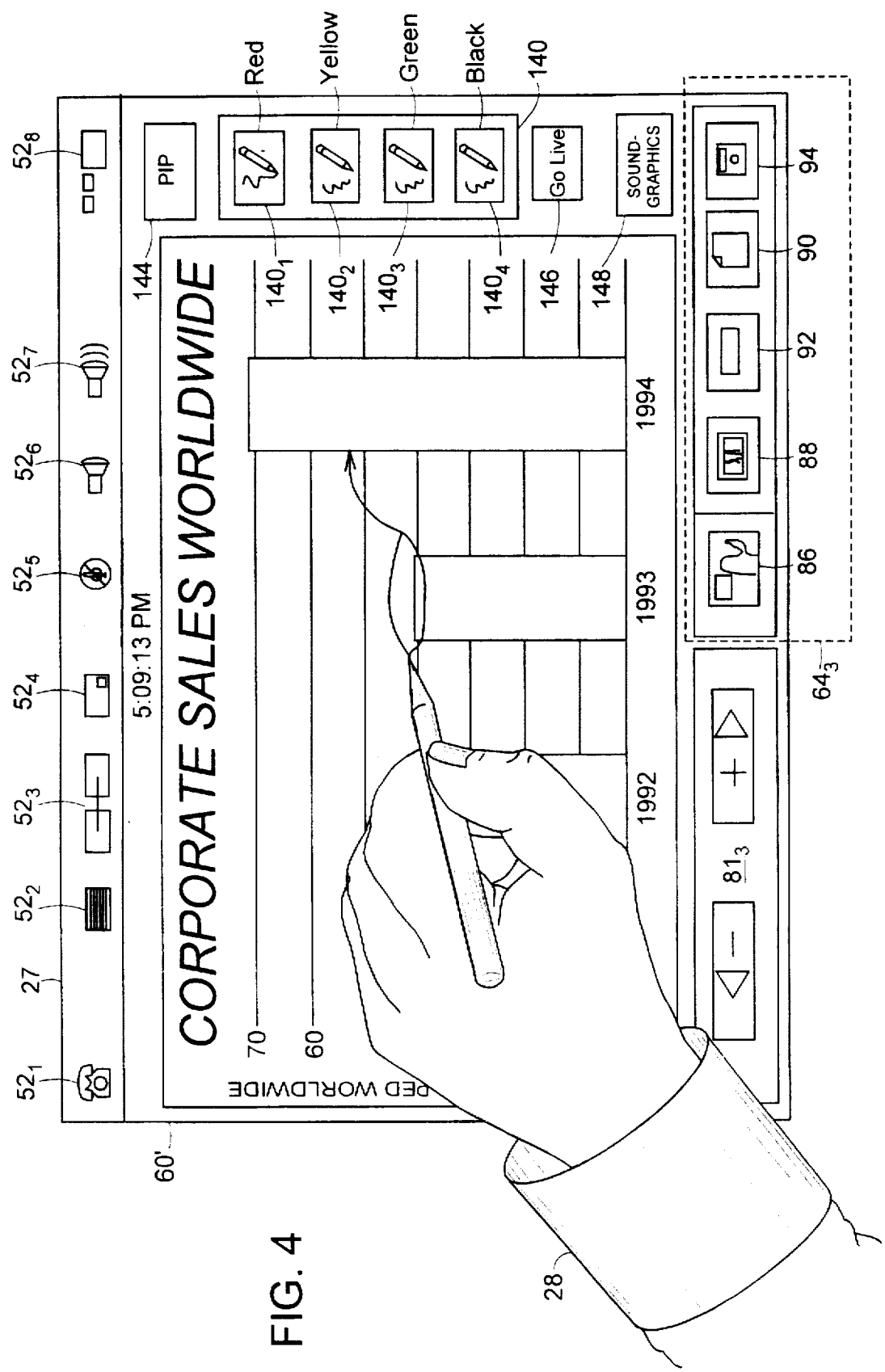
FIG. 4 is an illustrative view of a display screen used in the control section of FIG. 2 when the video conferencing system of FIG. 1 is operating in a "Mark-up" mode; and, FIGS. 5A–5E are illustrative views of a display screen used in the control section of FIG. 2 showing video source control when various video sources are selected.

Referring now also to FIGS. 3 and 4, there are eight, "hard button" icons $52_1$-$52_8$ disposed across the top of the touch screen display 27. These icons are called "hard buttons" because they are displayed during both primary operating modes of the system 10: during a "Main-screen" mode and during a "Mark-up" mode, to be described. The "hard button" icons $52_1$-$52_8$, as well as other touch screen display icons to be described, are designed in such a fashion that each corresponds to a defined area on the touch screen display 27 and when actuated by touch, indicates to the microprocessor 38 of computer 32, via elographic board 48, that the icon has been selected by such touch. The touch may be by the podium speaker 28 or a graphic pen, not shown. The eight "hard button" icons $52_1$-$52_8$ are each individually marked with an icon representing an associated pop-up control screen function to be described. The "hard button" icons $52_1$-$52_8$ are shown in FIGS. 3 and 4 for the "Main-screen" mode and the "Mark-up" mode, respectively.

As mentioned briefly above, there are two primary operating modes used during a video conference: a "Main-screen" mode and a "Mark-up" mode. Each of these modes will be described in detail hereinafter. Suffice it to say here, however, that the "Main-screen" mode is entered on system power up. While the "Mark-up mode" also allows control of all video sources of the system 10, it also allows the podium speaker 28 to annotate and/or edit on top of any video image displayed on the touch screen display 27, as indicated in FIG. 4. The podium speaker 28 can switch between the "Main-screen" mode and the "Mark-up" mode at any time by touching the "Mode-switch", "hard button" icon $52_8$, here positioned at the top, far right of the touch screen display 27.

Briefly, the "Main-screen" mode is the main operational mode. It allows the podium speaker 28 to display, via touch icons on the touch control display 27, a selected one of a variety of video sources produced from, inter alia, the document camera 70, slide projector 66, VCR 68, etc. coupled to the input ports $35_1$-$35_8$ of the video selector 34, as noted above, to both the near end $12_1$ and far end audiences $12_1$-$12_n$ (FIG. 1) via interface, or CODEC 30. During the "Main-screen" mode (FIG. 3), the podium speaker's podium mounted, video display touch screen 27 is divided into two half areas; a "presentation" display area 60 which presents the image currently being sent to the video monitor $16_2$ at the local site $12_1$ and to monitors $16_1$ at the remote sites $12_1$-$12_n$; and, a "preview" display area 62, which provides an image for private viewing by the podium speaker 28 of the next video image which can be seen by the audience. It is noted that the icon video signals presented in the "presentation" display area 60 and the "preview" display area 62 are formed by the microprocessor 38 which sends icon video signals to the WIN1 card via the VGA card 44. The video signal from the selected one of the video sources fed to input ports $35_1$-$35_8$ for display in the "preview" display area 62 are fed to another input of the WIN1 card. The WIN1 card combines the VGA card 44 output, fed to the VGA input port A of the WIN1 card, with the video signal at output port $37_3$, fed to the input port B of the WIN1 card, to provide a VGA signal at its output. The VGA output of the WIN1 card is fed to VGA input port A of the WIN2 card. Input port B of the WIN2 card coupled to video signal at output port $37_2$. The VGA output of the WIN2 card is fed to the video display section 26 via line 51, as shown. Thus, the signal at the output of the WIN1 card includes both the icon display information and the "preview" display area information. The output signal from the WIN2 card includes icon display information, "preview" display area information and "presentation" display area information. Thus, after the WIN1 card "writes" the video signal at output port $37_3$ in the, here blue, "preview" display area 62, the WIN2 card "writes" the video signal at output port $37_2$ in the, here magenta, "presentation" display area 60. Thus, the WIN2 card provides the image in the "presentation" display area 60; and, the WIN1 card provides the image in the "preview" display area 62.

The "Mark-up" mode (FIG. 4) allows the podium speaker 28 to annotate and/or edit, on top of the image being sent to the local and remote sites $12_1$ to $12_n$. In this mode, there is only one display area, the "presentation" display area 60' which, during the "Mark-up" mode occupies about ⅔ of the total display region. That is, the "Mark-up" display area 60', is very similar to, but larger than, the "presentation" display area 60 used in the "Main-screen" mode, i.e. it is essentially like the "Main-screen" mode without any next image preview capability. In this, "Mark-up" mode, provisions are made to sequence through images or slides from a selected one of the video sources; but, there is no ability to preview them. Should preview be desired it is an easy matter to momentarily enter the "Main-screen" mode via a touch of the "Mode-Switch," "hard button" icon $52_8$ at the top far right of the display 27.

The other "hard button" icons $52_1$-$52_7$ disposed along the top of the display screen 27 in both the "Main-screen" mode and the "Mark-up" mode are mainly used before a video conferencing session to setup the user's preferences and dial the call. These other "hard button" icons $52_1$-$52_7$ are: "Dial Screen" $52_1$; "Setup Screen" $52_2$; "Swap" $52_3$; "S4000 PIP On/Off" $52_4$; "Audio Mute" $52_5$; "Volume Up" $52_6$; and "Volume Down" $52_7$, respectively. Briefly, the "Dial Screen" $52_1$ allows the user to Dial/Hang-up call, and access/edit a phone book for a pop-up screen, not shown. The "Setup Screen" $52_2$ is used to set user preferences and hardware configuration and to run diagnostics from a pop-up screen, not shown. The "Swap" $52_3$ is used in a one monitor system; i.e., when monitor section 16 has a single monitor. In such case, actuation of "Swap" $52_3$ changes between a PIP, or small window image, typically of the local site video, on the one hand, and a larger window image on the other hand. The "S4000 PIP On/Off" $52_4$ turn the System 4000's internal picture-in-picture (window) image on and off. The "Audio Mute" $52_5$ turns Off/On the local site $12_1$ microphone. The "Volume Up" $52_6$ increases local site $12_1$ loudspeaker 18 volume. The "Volume Down" $52_7$ decreases site $12_1$ room loudspeaker 18 volume. Once entered, any of the pop-up screens can be dismissed by pressing a "Hide" button, not shown, on the pop-up screen, not shown.

Referring again also to FIG. 2, video source selection touch control areas $64_1$, $64_2$ in the "main-screen" mode, and a video source selection touch screen touch area $64_3$ in the "Mark-up" mode, enable the podium speaker 28 to easily select one of a plurality of video devices, or video sources, such as slide camera 66, video cassette recorder (VCR) 68, document camera 70, the auxiliary (AUX) input, such an auxiliary camera 72 directed to blackboard 73 (FIG. 1), the personal camera 76, etc., coupled to input ports $35_1$–$35_8$. There is also a touch control icon, to be described, for accessing video images previously saved to the PC's hard drive 39, or a disk, as Targa (.TGA) files and fed, via Targa card 46, through PIP unit 36 to input port $35_5$ of selector or CODEC 30; i.e., graphic input port $35_5$. That is, the output of PIP unit 36 on line 74 is considered as a graphic video source 74. A multipoint site selection control section 80, displayed in the "Main-screen" mode, FIG. 3, has a number of text labeled site selection icons, to be described, in section $80_1$, and another site selection section $80_2$.

In general then, the purpose of the "Main-screen" mode is to facilitate podium speaker 28 presentation by enabling him/her to select from, and sequence through, video sources 66–76, or video cameras 14 at sites $12_1$–$12_n$, while the "Mark-up" mode enables the podium speaker 28 to edit, mark-up, annotate, etc., the video provided from a selected one of the video sources 66–76.

"Main-screen" Mode

As noted above, the "Main-screen" mode is directly entered when the system powers up and is the podium's basic control mode. The features implemented in the "Main-screen" mode are: Multipoint site selection and management; Point and View camera positioning; Personal PIP; Touch screen video source selection control; PC slide presentation Control; PC slide storage and filenaming; Integrated main camera (i.e., an "Instructor/Presenter" mode, to be described); document (DOC) camera; and 35 millimeter (mm) video slide projector control. The "presentation" and "preview" display areas 60, 62 are simultaneously displayed on the touch screen display 27 during the "Main-screen" Mode. That is, referring to FIG. 3, the "Main-screen" mode breaks the presenter's podium display 27 into five basic areas: the "preview" display area 62, or window, on the left; the "presentation" display area 60, or window, on the right; a site selection area 80 disposed along the bottom of the "presentation" display area 60 and "preview" display area 62; a video source selection area 64; and, a video source control area 81 directly under the "presentation" and "preview" display areas 60, 62, as shown. Video source selection area 64 appear in two separate regions $64_1$, $64_2$; i.e., region $64_1$ is disposed beneath the "presentation" display area 60 to select any one of the plurality of video sources 66–76 at any time for distribution to the local and remote sites $12_1$–$12_n$; and, region $64_2$ is disposed beneath the "preview" display area 62 to allow the podium speaker 28 to select any one of the plurality of video sources 66–76 at any time for his/her private viewing in the "preview" display area 62. A "transfer button", or icon, 84 is located between the "preview" and "presentation" display areas 60, 62.

The video source icons in each of the areas $64_1$, $64_2$, are: an "Instructor/Presenter icon 86; a "Slide Projector" icon 88; a "Document" icon 90; a "VCR" icon 92; a "PC Storage" icon 94; and an Auxiliary Video" (i.e., AUX) icon 96. As noted above, the "presentation" display area 60 is added to the VGA image using the WIN2 card, and the "preview" display area 62 is added to the VGA image using the WIN1 card. The image can be selected for either one of the display areas 60, 62 from one of a plurality of video sources 66–76 coupled to the input ports $35_1$–$35_8$ of the video selector 34 via the touch icons in areas $64_1$, $64_2$, respectively, on the display 27. However, in order to add annotation to the signals fed to the WIN2 card during the "Mark-up" mode, to be described, rather than have the video signals at input ports $35_2$–$35_8$ pass directly to output port $37_2$, an "indirect routing" path is used where video signals are routed through the video selector 34 in two sequential passes. More particularly, during a first pass, the signals at input ports $35_2$–$35_4$, $35_6$–$35_8$ are first coupled to output port $37_5$ for Targa board 46 to have superimposed thereon annotation and for storage and retrieval of graphic images from hard drive disk 39; the composite signal produced then being fed to input port $35_5$ for a second pass through the video selector 34 to the WIN2 card at output port $37_2$. The signal at input port $35_7$ is also fed to the DOC output port $37_6$ for distribution by CODEC 30 to the video monitor $16_2$ at local site $12_1$, and the video monitors $16_2$ at the remote sites $12_1$–$12_n$. Further, the input port $35_5$ is also coupled to the AUX output port $37_4$ for recording by the VCR 68. Input port $35_1$ which is fed by the personal camera 76 is, when selected as a video source, coupled directly to output port $37_7$. (It should be noted that the video for the "preview" display area 62 (i.e., to the WIN1 card via output port $37_3$) is coupled directly from input ports $35_1$–$35_8$ and is not coupled using the "indirect routing" path described).

When a "Instructor/Presenter" icon 86 is touched, the display area 60 or 62 above the touched icon 86 will display video from the local site $12_1$ coupled to input port $35_8$ via CODEC 30 in responds to control signals on line 47. More particularly, in response to control signals on line 47 and line 43, input port $35_8$ is coupled to output port $37_2$ or to output port $37_3$. If a picture in picture of the podium speaker 28 is desired in the "presentation" display area 60, a PIP icon 63 located in the upper right hand corner of the display area 62 is touched and the personal camera 76 video signal at port $35_1$ is coupled to output port $37_7$. When "Slide Projector" icon 88 is touched, the control signal on line 47 couples input port $35_2$ to output port $37_2$, via the "indirect routing" path described above, or directly to output port $37_3$. When the "Document Camera" icon 90 is touched, the control signal on line 47 couples input port $35_4$ to output port $37_2$, via the "indirect routing" path described above, or directly to output port $37_3$. When the "VCR" icon 92 is touched, the control signal on line 47 couples input port $35_3$ to output port $37_2$, via the "indirect routing" path described above, or directly to output port $37_3$. When "PC Storage" icon 94 is touched, the control signal on line 47 couples input port $35_5$ to output port $37_2$, via the "indirect routing" path or directly to output port $37_3$. And, when the "Auxiliary Video" icon 96 is touched, the control signal on line 47 couples input port $35_6$ to output port $37_2$, via the "indirect routing" path, or directly to output port $37_3$. When a live PIP image overlay of the podium speaker 28 is being sent from the personal camera 76, via output port $37_7$ to PIP unit 36, it is displayed in region 53 (FIG. 3) of the "presentation" display area 60 along with the video at the other input to PIP unit 36, as noted above; and, the composite video insert produced by PIP unit 36 shown in the "presentation" area 60 is seen by the near end site $12_1$, via output port $37_1$ and far end site $12_2$–$12_n$ audiences via CODEC 30 DOC output port $37_6$. At power up the "presentation" display area 60 displays the near end $12_1$ main room video camera 14 output video signal. When video from a local site $12_1$ camera, or far end site $12_2$–$12_n$ camera, is selected for the presentation display area 60, the video at input port $35_5$ is also always coupled to: output port $37_4$ to enable the VCR to record such video; output port $37_6$ for video monitor $16_2$, at the local site $12_1$ and for video monitors $16_1$ at the remote sites $12_1$–$12_n$; and, output port $37_2$.

Referring now also to FIG. 5A, the "presentation" display area 60 is, here, bordered by a magenta color outline. The magenta outline extends below the "presentation" display area 60 to include the icons in the video source selection area $64_1$, the site selection area 80 and the video source control area $81_1$ of area 81. The "preview" display area 62 is here in a blue color outline. The blue outline extends to "preview" display area 62 video source control section $64_2$ and control area $81_2$. The WIN2 card writes video in the magenta color regions and the WIN1 card writes in the blue color regions. The microprocessor 38 produced VGA signal from the VGA card 44 (FIG. 2) produces blue in the area to be filled in by the WIN1 card and magenta in the area to be filled in by the WIN2 card. Thus, as noted above, the WIN2 card presents the video in the "presentation" display area 60 and the WIN1 card presents the video in the "preview" area 62.

The video in the "presentation" display area 60 and "preview" display area 62 are overlaid with camera control icons 83, 85, respectively (FIGS. 3 and 5A) when there is a controllable camera 14 displayed in the respective area. The icons in the "presentation" and "preview" display areas 60, 62 include up, down, left, right arrows $98_1$–$98_4$, $100_1$–$100_4$, respectively, as shown, as well as zoom-in, zoom-out icons 102, 104, respectively, to control movement of the video camera or cameras 14 supplying the video to the "presentation" and "preview" areas 60, 62. The camera control arrows will appear as an overlay over the video image in the "presentation" and "preview" display areas 60, 62. Touching the appropriate "Up", "Down", "Left", "Right", "Zoom in", and "Zoom Out" control icon will cause the selected camera 14 to respond appropriately, similar to normal keypad control used in the Picturetel 4000 director control panel. An "Easy Zoom" feature, to be described, is active as well.

Above the "presentation" display area 60 appears the label 106: "PRESENTATION" (FIG. 3). To the left of the label 106 is a highlight box 108 which is highlighted in magenta when the video in the "presentation" display area 60 is being broadcast by the near end site $12_1$. This magenta light will generally be on except when in a voice activated site selection mode (to be described) in which case it will be green.

The "preview" display area 62, as noted above, is disposed on the left side of the "presentation" display area 60 and displays either the video from a selected far end site camera 14, or from some other podium speaker 28 selectable one of the plurality of video sources 66–76, for private video viewing by the podium speaker 28. Typically, the podium speaker 28 uses the "preview" display area 62 to prepare the next image, or video source, to be presented to the near end $12_1$ and far end site $12_1$–$12_n$ audiences. At power up the "preview" display area 62 displays the image that is on the local, near end $12_1$, room main monitor 16. The main monitor 16 view is the default view for this window. Above the "preview" display area 62 appears a label 110 of either: "PREVIEW" or "FAR END"; the label 110 here shown presenting "PREVIEW". If previewing one of the video sources 66–76 at the near end site $12_1$, one of the icons in the video source selection section $64_2$ representative of the video sources 66–76, is touched by the podium speaker 28 and the label 110 above the "preview" display area 62 reads "PREVIEW". The selected video source is coupled from the selected one of the input ports $35_1$–$35_8$ to the WIN1 card output port $37_2$ of the video selector 34. The video at the output port $37_2$ is fed to WIN1 card; and hence, is the video for the "preview" display area 62. If a site selection icon in the site selection region $80_1$ is touched, the label 110 above the "preview" display area 62 is changed to "FAR END". If a far end site has been transferred into the "presentation" display area 60, making that far end site the broadcaster, the site location icon then acts to change the broadcasting site.

The "Transfer" icon 84 appears between the "presentation" and "preview" display areas 60, 62, as shown. When touched, the video signal fed to output port $37_3$ is coupled to output port $37_2$ and the image on the left hand "preview" display area 62 for private viewing by the podium speaker 28 is transferred to the publicly viewable "presentation" display area 60 on the right. Also, all previous video source control and audio signals are turned off. The "Transfer" icon 84 is, here, not specifically labeled with a name, but is designed in the shape of an arrow that indicates the direction of image transfer, i.e. from left to right. The transfer function is very intuitive in that any image on the left, whether it be a local document 70, VCR 68, a far end site $12_1$–$12_n$, or the local, near end $12_1$ camera 14, etc., is automatically placed in the "presentation" display area 60 for everyone i.e., the monitors 16 at the local and remote sites $12_1$–$12_n$ to see when the "Transfer" icon 84 is touched. After the transfer of a video presentation device, the "preview" display area 62 defaults back to the local site $12_1$ main monitor 16 image. After the transfer of a browsed far end site $12_1$–$12_n$, the "preview" display area 62 displays black. The "Transfer" icon 84 is not displayed when transfer is not possible (e.g. when a browsed site has already been transferred to the "presentation" display area making that far end site the broadcaster.)

An "Easy Zoom" feature allows the podium speaker 28 to easily position any known pan-tilt-zoom (PTZ) camera 14 using the touch screen display 27. When any PTZ camera 14 is being displayed, the podium speaker 28 can simply touch the image area in the "presentation" display area 60 (or the "preview" area), and hand drag out a "Zoom Box" imaged on the touch screen display 27 to specify a new pan-tilt-zoom setting for that particular camera 14. These touch commands are sensed by the screen 27 and the corresponding position data are fed via elographic card 48 to microprocessor 38. The microprocessor 38 (FIG. 2) interprets the position data to identify the desired zoom locations, as well as modify the display to create the "Zoom Box". This allows the podium speaker 28 to specify the portion of the image that should approximately fill the "presentation" or "preview" display areas 60, 62 after the PTZ operation. For familiarity, the "Easy Zoom" interface methodology is exactly the same as that used to specify zoom in many graphic software applications. A "Zoom Box" is created from the center of a point initially touched by the podium speaker 28, outwardly as the podium speaker 28 moves his/her finger away from the initially touched point, that is, the podium speaker 28 first touches the desired new camera 14 center point and then moves outward to define the overall field of view and then stops touching the touch screen display 27. The "Zoom Box" will automatically have correct aspect ratio for the desired camera. Once the podium speaker 28 stops touching the touch screen display 27, the appropriate PTZ command is computed by the computer 32 and sent to the camera 14 at local or remote sites $12_1$–$12_n$ via line 47, CODEC 30, and, if remote, bridge 13. During the touch command a temporary flashing blue "Zoom Box" is drawn over the video image by computer 32 to show the user what will be included in the selection. This "Zoom Box" is maintained in the appropriate 4:3 image aspect ratio by computer 32 at all times. As a safety precaution, any "Easy Zoom" command that would result in a very small PTZ "Zoom Box" is ignored by computer 32. This also allows the podium speaker 28 a method to cancel an "Easy Zoom" command by collapsing the dragged out "Zoom Box" to the point of origin before releasing his/her hand from the touch screen. Whenever a "Zoom" command would be ignored or is canceled, the "Zoom Box" disappears indicating that no PTZ operation will occur when the podium speaker 28 stops touching the touch screen display 27. There can be a delay in the order of a second in performing the "Easy Zoom" operation when a far end camera 14 is being controlled.

As noted above, the site selection area 80 includes icons across the bottom of the "presentation" and "preview" display areas 60, 62 of the VGA touch screen 27. The site selection area 80 has within it two icon area $80_1$, $80_2$. Area $80_1$ presents icons representative of specific remote site locations; area $80_2$ presents four icons 118, 120, 122, and 124 representative of four site selection modes, respectively: a "Voice Activated" mode (icon 118); a "Director Control/Teaching Mode" (icon 120); a "Round Robin" mode (icon 122); and, a "Find Speaker" mode (icon 124).

In the "Director Control/Teaching Mode", entered by touching icon 120, the podium speaker 28 can select, or browses, the sites $12_1$–$12_n$ by use of icons in site location area 801. In such area $80_1$ there is one icon for each of the remote sites $12_2$–$12_n$ involved in a conference. During multipoint calls, one or more site icons in area $80_1$ of the site selection section 80 are visible. During a point to point call, only one site icon is visible. When the far end site $12_1$–$12_n$ is in the left hand, "preview" display area 62, now labeled, "FAR END" in label 110, touching a site icon in the site selection area 80 causes a new one of the far end sites $12_1$–$12_n$ to be browsed in the "preview" display area 62. If one of the far end sites $12_2$–$12_n$ is a broadcaster shown in the "presentation" display area 60, touching another site icon in area $80_1$ will switch the "presentation" display area 60 video from the current site to the new broadcaster site. The system 10 returns to the site $12_1$ of the podium speaker 28 by touching any of the icons in the video source selection $64_1$ below the "presentation" display area 60.

For each site icon in the site selection region $80_1$, a highlight box 112 is located immediately to its left. The site that is being viewed in the "preview" display area 62 is highlighted in box 112 in a darker blue and a site being viewed in the "presentation" display area 60 is highlighted in box 112 in a darker magenta. In the voice activation mode, to be described, without browsing, the broadcasting site is highlighted in green since it is neither browsed nor otherwise selected directly as a broadcasting site.

The icons in the site selection area $80_1$ are disposed at the bottom of the "presentation" and "preview" display areas 60, 62 of the VGA display screen 27 in horizontal rows, four icons wide, as shown. This gives each icon space to display the far end site name. The site icons are added from left to right at the start of a conference or as people dial into the network bridge 13 (FIG. 1) during a conference. As many as four rows of icons are, here, possible; only two of which are displayed at any given time. When more than eight remote sites are involved in a conference, a third and possibly fourth row of site icons is created. As there is, here, only room enough to display two rows of four icons, a method of row scrolling is provided. When more than eight icons exist, scrolling arrows 114, 116 automatically appear at the left of the site icon rows in area $80_1$ currently being displayed. Touching the arrow 114, 116 will cause a next upper and lower row of icons to be displayed. The direction of the arrow 114, 116 will change depending on the rows being displayed; when the top/first row of four site icons is displayed the arrow 114 points down, it points up when the last/bottom set of site icons is in view. If the middle two rows are displayed, both up and down arrows 114, 116 appear.

As noted above, each site icon in the site location region $80_1$ has a letter character label, here, at most a 12–14 character label (variability due to proportionally spaced text) identifying the site $12_2$–$12_n$. This label is automatically filled in by the computer 32 with the site name received from the far end system or multipoint bridge 13 when running PictureTel SG-3 software. In a point to point call, a single site icon is visible. In a multipoint call, icons are assigned first left to right starting at the top and working down to the bottom row. If a call drops, the site name in the site icon assigned to that site turns gray. In a standards based call (using H.320), site names do not appear and the voice activated bridge 13 may appear as one single site icon in the call. Incoming calls, or calls already on the bridge 13 when the system 10 calls in, are allocated an icon which then remains associated with the number of the bridge port which received the site call rather than the site name. In this way, if a call drops and is reconnected, the site will be assigned to the same icon as before (assuming the user dialed into the bridge 13 using the same numbers). If a system 10, connecting to a previously used port, has a different site name, that new site name takes the place of the one previously assigned to that icon. If a far end site has changed a button node name, that changed name is substituted when a dropped call reconnects. If there is no far end node name, the bridge 13 port number will be assigned to the icon. Should two identical node names be supplied, each will be identified by the port number prefix for the site name.

Site icons in the site location region $80_1$ allow a podium speaker 28 to select a particular site for browsing or broadcasting by touching icon 120. If no far end broadcaster is currently shown in the "presentation" display area 60, the icons in the site selection region $80_1$ will allow the podium speaker 28 to browse by touching site selection icons in area $80_1$. The highlight box 112 will light and the selected far end site $12_2$–$12_n$ will be displayed on the room main monitor $16_1$ and in "preview" display area 62 of the display. The label 92 above the "preview" display area 62 will change to "FAR END", as described above. If a far end site $12_2$–$12_n$ has been transferred into the "presentation" display area 60, thereby making that far end the broadcaster, the site icons then act to change to a new broadcasting site.

When in the "Browsing" mode, entered by touching icon 120, a selected site location icon in $80_1$ will cause any previously highlighted icon in the video source selection region 64 under the "preview" display area 62 to deactivate. Conversely, if a video source icon 66–76 is touched, the browsed site will disappear from the "preview" display area 62 and be replaced by the previewed video source from the selected one of the video sources 66–76. The browsed site will remain on the local room main monitor $16_1$ until another browsed site location icon in region $80_1$ is touched. Only one site icon in the site location region $80_1$ may be highlighted at one time since only one far end video can be received at any one time.

As noted above, a "Voice Activation" mode of site selection is provided. More particularly, when the podium speaker 28 touches a "Voice Activated" icon 118, the multipoint bridge 13 is connected, by the interface, or CODEC 30 to respond to signals from the microphones 20 at the local and remote sites $12_1$–$12_n$, and enters a voice activated switching mode which releases podium speaker 28 controlled site selection and disables "Browsing" mode site selection and displays the last far end site which is currently speaking. The site location icons $80_1$ track the broadcasting site with a green indicator light in areas 112. When in the "Voice Activation" mode the "Voice Activated" icon 118 remains highlighted.

It should be noted that when first dialing into the bridge 13, "Voice Activated" may be enabled with browsing "on" unless another site has already taken directorship and changed the state of the bridge 13. While in "Voice Activation" mode, a far end site $12_1$–$12_n$ broadcaster does not appear on the "presentation" display area 60 because the podium speaker 28 has no control over that site. The far end site will appear in the "preview" display area 62 and label 110 will read "FAR END". As noted above, the "presentation" display area 60 displays the video source that is displayed at the local site $12_1$ and to the far end sites $12_1$–$12_n$. The label box 108 above the "presentation" display area 60 lights when the system 10 is actually broadcasting.

Touching a "Director/Teach" icon 120 establishes a "Director/Teach" mode and cancels the "Voice activation" mode, just described. In the "Director/Teach" mode, the current broadcaster will appear in the "presentation" display area 60, or window. Should the podium speaker 28 touch the icon 130 (FIG. 5A) at any time during "Director/Teach" mode, the podium speaker 28 becomes the broadcaster (i.e., the personal camera 76 becomes the video source). The icons in the site selection region $80_1$ are active during "Director/Teach" mode because browsing is enabled at the bridge 13.

The "Round Robin" mode is only available when in the "Director/Teach" mode, it being noted that browsing is enabled. To activate the "Round Robin" mode, the "Round Robin" icon 124 is touched by the podium speaker 28. In such "Round Robin" mode, each site is automatically browsed in sequence after a specified amount of time. This allows the podium speaker 28 to sequentially view each local and remote site $12_1$–$12_n$ in a multipoint conference automatically. This feature only affects the selection of the site viewed on the local site $12_1$ room monitor $16_1$ and/or the preview display area 62 and not who is the current broadcaster for the conference. The blue highlight on the site icon tracks the site being browsed.

A "Find Speaker" mode may be selected only when in the "Director/teach" mode. Its purpose is to help the podium speaker 28 locate the site of the current far end speaker (e.g. someone answering a question posed by a teacher to the students) without permanently switching the bridge 13 out of a teach/direct mode. When the "Find Speaker" icon 124 is touched, the site icons in the site location icon section $80_1$ will highlight while the bridge 13 seeks out the speaker.

When located by detecting the loudest sound at the local and remote sites, the speaker will become the broadcaster and the "Find Speaker" icon 124 will deactivate. (The bridge 13 is actually briefly switching into the "Voice Activation" mode until the speaker is found, that site becomes the broadcaster.) If nobody is speaking at a far end site while the "Find Speaker" mode is activated and the near end was the last to speak, the "Find Speaker" mode will time out after five seconds without "finding" a new broadcaster. If a far end site is broadcasting and a different far end site issues a question, and then the "Find Speaker" icon 124 is touched, the bridge 13 will first switch back to the local site $12_1$ making it the broadcaster and then look for the person asking the question. If the director/presenter 28 touches the "Transfer" icon 84 to transfer a far end site from the "preview" display area 62 to the "presentation" display area 60, or if the podium speaker 28 touches an active video source selection icon in the video source selection area $64_1$ displayed under the "presentation" display area 60 while in the "Find Speaker" mode, the "Find Speaker" mode will automatically deactivate.

An icon 128 (FIG. 1) of a snapshot camera in the lower left corner of the "presentation" display area 60 enables the podium speaker director 28 to save a PC Slide to the hard disk 39 of the computer 32. Touching the "Snapshot Camera" icon 128 holds the current image in the "presentation" display area 60 in the Targa board 46 and brings up an on-screen alpha keypad, not shown, displayed as a pop-up screen, not shown, and a filename entry field. The podium speaker 28 can enter an eight character or less file name for the held image and chooses the "OK" or the "CANCEL" tactile icons on the keyboard to save or cancel the saving of the image. When the image is saved, a message box, not shown, pops up saying that the file is being saved. Cancellation will hide the keypad and release the image.

As noted above, two regions of video source selection icons, areas $64_1$, $64_2$ are located below the "preview" and "presentation" display areas 60, 62, respectively, as shown; one area $64_1$ under the former area 60; and, a similar area $64_2$ under the later area 62. The icons in each of the areas $64_1$, $64_2$ allow the podium speaker 28 to select a video source for display in the corresponding area 60, 62 above it. Immediately above the video source selection areas $64_1$, $64_2$, control icons specific to the selected video source appear in the video source control areas $81_1$, $81_2$, respectively, as will be described.

As noted above, immediately below the "presentation" display area 60 and the "preview" display area 62 are video source control areas $81_1$, $81_2$, respectively. The display in each control area $81_1$, $81_2$ is a function of the video source selected by the podium speaker 28. Thus, as shown in FIGS. 3 and 5A, the video source control areas $81_1$, $81_2$ show the controls displayed when the "instructor/presenter" icon 86 is touched under the "preview" area 62 and the 35 mm slide projector camera 66 icon 88 is touched under the "presentation" area 60 is touched. As shown in FIG. 5A there is a main camera icon 130 and an auxiliary camera icon 132 along with four "Preset" icons $134_1$–$134_4$ displayed in the control area $81_2$ under the "preview" display area 62; and, a pair of oppositely directed arrows $136_2$, $136_1$ displayed in the control area $81_1$ under the "presentation" display area 60. Thus, the podium speaker 28 can control the "next" or "previous" slides, via the arrows $136_1$, $136_2$ respectively, for the "presentation" display area 60 which is also being broadcast to the audiences at the local and remote sites $12_1$–$12_n$; while privately viewing the reaction of the audiences at the local and remote sites $12_1$–$12_n$ including selecting either a main camera 14 or auxiliary camera 76 as the video source for "preview" display area via icons 128, 130. Also displayed are the Preset icons $134_1$–$134_4$ which operate as they do in a normal keypad. They are saved in a manner similar to radio station presets on an electronic car radio. When the camera 14 is positioned as desired, the podium speaker 28 touches and holds the preset icon. A message box pops up after 2 seconds notifying the director/presenter that the preset has been saved.

Referring now also to FIG. 5B, if the "Slide Projector" camera 66 is selected by touching a 35 mm slide icon 88 under the "preview" or "presentation" display areas 60, 62, the icon 88 will be highlighted and the slide projection camera 66 output will be displayed in the appropriate "preview" or "presentation" display area 60, 62. Correspondingly, a video source control area $81_1$, $81_2$ as shown in FIG. 5B will display arrows $136_1$, $136_2$ for "previous" and "next" commands to the 35 mm slide projector. When touched, the slide projector will advance, or reverse, respectively, to the adjacent slide in the sequence. Holding the icon $136_1$ or $136_2$ down will continuously increment the sequence in the appropriate direction.

Referring to FIG. 5C, the "VCR Control" icon 92 is a symbol of a video tape under the "preview" and "presentation" display areas 60, 62 and represents the VCR video source 68. When touched, the icon 92 will be highlighted and the VCR 68 video output will be displayed in the appropriate "preview" or "presentation" display areas 62, 60. The video source control area $81_1$ or $81_2$ above the VCR icon 92 will display rewind, play, fast forward, stop and pause control icons, as shown in FIG. 5C. Touching the control icon will initiate the action by the VCR 68 implied by the icon. The exact action of the VCR 68 will depend on the VCR used (e.g. pressing fast forward while in play will continue to display the video as it fast forwards on most VCRs).

Referring now to FIG. 5D, the "Document Camera" icon 90 under either the "preview" or "presentation" display areas 62, 60 represents the document camera video source 70. When touched, the icon 90 will be highlighted and the document camera will be displayed in the appropriate "preview" or "presentation" display area 62, 60. The appropriate video source control area $81_1$, $81_2$ above the highlighted "Document Camera" icon is blank since the document camera 70, in the illustrated embodiment, is manually controlled.

Referring now to FIG. 5E, the "PC Storage" icon 74 in the symbol of a diskette, is disposed under the "preview" and "presentation" display areas 62, 60 to represent video sources stored on the computer hard disk 39. When touched, the icon 74 will be highlighted and the "preview" or "presentation" display area 62, 60 above it will display black. The control area above the selection icon will display left and right pointing arrows. A file selection box will also be displayed showing a list of files available. A scroll bar automatically appears on this selection box when there are more files than can be shown in the box simultaneously. An image can be selected from the file list by touching the file name once. The image immediately before or after that image can then be accessed using the appropriate right or left pointing arrow. If no file was selected (black screen) prior to touching the right pointing arrow, the first file in the list will be chosen. If no file was selected prior to touching the left pointing arrow, the screen will remain black.

The "Auxiliary Video" icon 96 under either the "preview" or "presentation" display areas 62, 60 represents an auxiliary video source (e.g. a video scan converter), here, blackboard directed camera 72 (FIG. 1) available to the podium speaker 28. When touched, the icon 96 will be highlighted and the auxiliary video source will be displayed in the appropriate "preview" or "presentation" display areas 62, 60. The video source control area $81_1$, $81_2$ above the "Auxiliary" icon 96 is blank since the video device type is unknown to the system 10 when the system is manufactured.

It should be noted that only one of video source icon 86, 88, 92, 94, 96 in each one of the regions $64_1$, $64_2$ can be activated (highlighted), (i.e., one video source icon at one time under the "preview" display area 62 and one video source icon at one time under the "presentation" display area 60). In the illustrated embodiment, the same video source icon can not be activated under both the "preview" and "presentation" display areas 62, 60 at one time.

"Mark-up Mode"

The "Mark-up" screen mode is entered using the mark-up/main screen "hard button" icon $52_8$ located at the far right above the screen, as described above. The mark-up screen is a larger view of the same video that is seen in the "presentation" display area 60 during the "Main-screen" mode. The features implemented in the "Mark-up" mode are: Personal PIP; Device selection and control; Annotation in a choice of colors; and, S-4000 freeze-frame graphic. In this mode, a single video edit/annotate display area 60' (FIG. 4), or window, bordered to the right by icons in an annotation area 140, below by icons in video source control area $64_3$ and, to the left thereof, a video source control area $81_3$, are all presented on a magenta background. The video edit/annotate display area 60' is approximately ⅔ of the total touch screen display screen 27 size.

Annotation tool icons $140_1$–$140_4$ in the touch screen 27 annotation area 140 are provided so the podium speaker 28 can add color annotation to any of the video images accessible through the system 10. The video sources available are the same as those offered for the "presentation" display area 60 during the "Main-screen" mode and are selectable by icons in the video source selection area $64_3$. When the podium speaker 28 first enters the "Mark-up" mode, the video source selection area $64_3$, a PIP icon 144, and "Hold"/"Go Live" icon 146 are visible and the "Send Graphic" icon 148 is visible during a videoconferencing call. The annotation pen color icons $140_1$–$140_4$ are not visible.

When the desired video image is first in the video edit/annotate display area 60', the annotation pen color icons $140_1$–$140_4$ are not visible in the annotation area 140. The "Hold"/"Go Live" icon 146 initially reads "Hold" (instead of reading "Go Live", as shown). When the "Hold" icon 146 is touched, the image in display area 60' is "frozen" (i.e., stored in the buffer memory, not shown, in Targa card 46 (FIG. 1)). The podium speaker 28 annotates by touching the touch screen 27. The elographic card detects the touch, and, inter alia, the "Hold"/"Go Live" toggles from "Hold" to "Go Live" and the image on display area 60' is, as it is annotated on the display area 60', distributed "live" to the video monitors 16 at the sites $12_1$–$12_n$. The image in the display area 60' is "held" or "frozen" so that it can not be inadvertently moved and become misregistered with respect to the added annotation. (This is NOT an S-4000 freeze-frame graphic—it is an image capture performed by the Targa board 46 resident in the computer 32).

More particularly, when the "Hold" command is invoked by touching the "Hold"/"Go Live" icon 146, the pen color toolbar in annotation area 140 appears at the right of the display area 60'. In the "Go Live" state, if, any video source icon in area 64₃, or any icon in the video source control area 81₃ (such as the "next", "previous" (35 mm slides) arrows shown in FIG. 5) is touched, the annotation area 140 will clear and the toolbar will disappear. The "Hold/Go Live" icon 146 then toggles back to read "Hold", and the video display area 60' will again show motion video of the video source selected from area 64₃.

The color selection in the toolbox in annotation area 140 toolbar are: Red (icon 140₁), yellow (icon 140₂), green (icon 140₃) and, black (icon 140₄). The podium speaker 28 can touch any of the icons to select a color. Once chosen, the active color will be highlighted and the podium speaker 28 can proceed to use the tool within the video display area 60' border. Only one pen color can be active (identified by white highlight) at once. When the annotation area 140 is brought up by selecting the "Hold" icon 146, the annotation color that was last used will be active. When a new color is desired, that color icon is touched.

Video source icons are displayed in the video source section 64₃ and behave in the same manner as described above in the "Main-screen" mode for sections 64₁ and 64₂ in the "presentation" and "preview" display areas 60, 62. They are always visible, even while a "frozen", or "Held" image is displayed in the video display area 60'.

A Personal PIP toggle icon 144 selectively displays, or hides, the video PIP overlaid on the video in the display area 60'; in a manner similar to that used with PIP icon 63 in the "Main screen" mode. The PIP toggle icons 63, 144 always display the word "PIP" and does not highlight. The on/off state of the PIP icons 63, 144 will be maintained when switching between the "Mark-up" mode and the "Main screen" mode. Video in the Personal PIP can be changed using camera controls in the "preview" display area if the personal camera device is selected as the video source under the "preview" display area; and assuming the "Near End Camera" option is selected for the Personal PIP video source in setup screen, not shown. The PIP sub-region of area 60' is moveable by touching anywhere within the border of the PIP sub-region and dragging the PIP sub-region to the new desired location in display area 60'. The PIP sub-region can be positioned in any of the four corners within the video display area 60'. The PIP will snap into the corner position if released near a corner of the display area 60'. The PIP sub-region is not sizable by the podium speaker 28.

A "Send Graphics" 148 icon acts to send an S-4000 freeze frame graphic, of whatever image is shown in the "Mark-up" mode screen video display area 60' (including an image from a main or aux camera), to the remote sites. Once touched, a message window, not shown, pops up alerting the podium speaker 28 that a graphics transfer is in progress. The PIP sub-region will turn off during the transfer and then reappear when the transfer is complete. When complete, the "Mark-up" mode screen video display area 60' continues to display the same live presentation image. The freeze frame graphic displays at the far end 12₁–12ₙ in the same way as with a keypad operated S-4000 CODEC. In the local site 12₁, however, the display monitor 16₂ will continue to show the local, uncompressed image that is in the "Mark-up" mode video display area 60' (i.e. the graphics display is overridden by the display of live local video). Annotation will only work over the live video channel. "Send Graphic" is intended to provide a higher resolution image as a reference for the far end sites 12₁–12ₙ. It is not meant to be the primary presentation. A "Snapshot" icon 128, described above, is also available in the "Mark-up" mode.

Having described a preferred embodiment of the invention, other embodiments will now become readily apparent to those of ordinary skill in the art, it is felt, therefore, that the invention should not be restricted to this disclosed embodiment, but rather should be limited only by the spirit and scope of the appended claims.

What is claimed is:

1. A video conferencing system wherein a local site is networked with at least one remote site to interchange audio and video information, the at least one remote site having a video camera, a video monitor, a loudspeaker and a microphone, the local site having a video camera, a loudspeaker and a microphone, and further having:

a controller, comprising: an interconnected video display section and control section, for controlling distribution of generated audio and video information among the sites selectively in accordance with electrical signals fed to the control section in response to a tactile command from a podium speaker to the video display section, wherein the video display section includes, in a first mode of operation preview display section includes, in a first mode of operation preview and presentation video display areas, wherein video information from a first video source, selected from a plurality of different video sources including video cameras at the remote and local sites, being displayed in the presentation area is distributed to the video monitor at the at least one remote site, and wherein the control section, in response to a command from the podium speaker, causes video information from a second video source selected from the video sources, being displayed in the preview area to be distributed to the video monitor at the at least one remote site in place of the previously distributed, first mentioned video information from the first selected video source.

2. The video conferencing system recited in claim 1 wherein each of the presentation and preview areas includes a corresponding video source selection area for displaying icons representative of the plurality of different video sources and wherein the control section selectively couples one, or ones, of the video sources to the preview and presentation display areas in response to the tactile commands by the podium speaker to the corresponding video source selection area.

3. The video conferencing system recited in claim 2 wherein the local site further comprises a video monitor for displaying the video information being displayed in the presentation area.

4. The video conferencing system recited in claim 2 wherein the video display section includes a site selection area for displaying site icons representative of the locations of remote sites and wherein the control section provides a control signal to couple video signals from a selected remote site to the video display in response to a site selection tactile command to a selected site icon.

5. The system recited in claim 2 wherein the video display section includes a plurality of video source control icons for controlling operation of a selected one of the video sources.

6. The video conferencing system recited in claim 1 wherein video information provided by the control section to the preview area is transferred to the presentation area in response to a tactile command by the speaker to the display section.

7. The video conferencing system recited in claim 1 wherein the control section, in a second, mark-up mode of operation, in response to podium speaker tactile commands to the video display section, edits the video information displayed on the video display section and controls the distribution of the edited information to the video monitors at the remote and local sites.

8. The video conferencing system recited in claim 1 wherein the video display section includes a video source control area for displaying icons representative of control functions for the plurality of different video sources and wherein the control section provides control signals to the plurality of different video sources in accordance with tactile commands by the podium speaker to the video source control area.

9. The video conferencing system recited in claim 1 wherein the controller includes a zoom control, responsive to speaker tactile commands to the video display section identifying a portion of the video information displayed on the video display section, for commanding one of a plurality of video source cameras generating the video information on the video display section to zoom in on the identified portion.

10. The video conferencing system recited in claim 9 wherein each one of the preview and presentation areas have a corresponding video source selection area for displaying source icons representative of the plurality of different plurality of different video sources and wherein the control section selectively couples one, or ones, of the video sources to the preview and presentation display areas in response to tactile commands by the speaker to the source icons in the corresponding video source selection area.

11. The video conferencing system of claim 1, wherein in a mark-up mode of operation, the control section edits the video information displayed on the controller video display section in response to a command from the podium speaker such that the video information displayed on the controller video display section is held for annotation in response to a hold command and the held video information is distributed to the video monitor at the at least one remote site in response to a go live command.

12. A video conferencing system wherein a local site is networked with at least one remote site to interchange audio and video information, the at least one remote site having a video camera, a video monitor, a loudspeaker and a microphone, the local site having a video camera, a loudspeaker and a microphone, and further having:
- a controller, comprising: an interconnected control panel section, video display section, and computer for causing distribution of generated audio and video information among the local and the at least one remote sites selectively in accordance with command signals fed to the controller by a director, the controller video display section displaying video information generated by a selected one of a plurality of video sources, including video cameras at the remote and local sites, and causing distribution of the video information from the selected one of the video sources to the video monitor at the at least one remote site and to the video display section; and,
- a zoom control, responsive to a tactile command by the director on the video display section identifying a portion of the video information displayed on the controller video display section, for commanding the one of the video sources generating the video information on the video display section to zoom in on the selected identified portion.

13. The video conferencing system recited in claim 12 wherein the controller video display section includes a preview video display area for displaying video information from a second selected one of the plurality of video sources and in response to a command from the director, causes distribution of such information to the video monitor at the at least one remote site in place of the previously distributed, video information from the first mentioned selected one of the plurality of video sources.

14. The video conferencing system recited in claim 13 wherein the video information from the second selected one of the plurality of video sources is transferred to the first mentioned display section in response to a transfer command from the director and such transferred video information is distributed to the video monitor at the at least one remote site in place of the previously distributed, video information from the first mentioned selected one of the plurality of video sources.

15. The video conferencing system recited in claim 14 including an editor, responsive to the director, for editing the video information displayed on the controller video display section and for causing distribution of the edited displayed video information to the video monitor at the at least one remote site.

16. The video conferencing system recited in claim 13 including an editor, responsive to the director, for editing the video information displayed on the preview video display area and for causing distribution of the edited displayed video information from the preview area to the video monitor at the at least one remote site when transferred to the first mentioned video display section.

17. The video conferencing system recited in claim 12 including an editor, responsive to the director, for editing the video information displayed on the controller video display section and for causing distribution of the edited information to the video monitor at the at least one remote site.

18. A video conferencing system wherein a local site is networked with at least one remote site to interchange audio and video information, the local site and the at least one remote site having a video camera, a video monitor, a loudspeaker and a microphone, the local site having:
- a controller, comprising: an interconnected control panel section, video display section, and computer, for causing distribution of generated audio and video information among the sites selectively in accordance with command signals fed to the controller by a director, the controller video display section displaying video information generated by a selected one of a plurality of video sources, the video sources including video cameras at the remote and local sites, the controller further for causing distribution of the video information from the selected one of the video sources to the video monitors at the local and remote sites,
- the controller video display section comprising a plurality of different display regions, one of said display regions being adapted to display presentation video information being distributed to the video monitors at the remote and local sites, another of said regions being adapted to display preview video information from a second selected one of the plurality of video sources, wherein the controller, in response to a director command, causes the preview video information to replace the presentation video information being distributed to the video monitors at the local and remote sites.

19. The video conferencing system recited in claim 18 including an editor, responsive to the director, for editing the preview video information displayed on the controller video display section and causing distribution of the edited displayed information to the video monitors at the remote and local sites.

20. The video conferencing system recited in claim 18 wherein the controller provides a video display from a selected one of the plurality of video sources in a sub-region within the first mentioned region of the display section, the video displayed in such first mentioned display section with the sub-region therein being distributed to the video display monitors at the local and remote sites.

21. The video conferencing system recited in claim 20 wherein the controller, in response to a director command transfers the video information displayed at the second one of the display regions to the first one of the display regions.

22. The video conferencing system recited in claim 21 wherein the display section comprises a touch screen adapted to respond to commands resulting from director contact with the screen.

23. The video conferencing system recited in claim 22 wherein the display section includes a plurality of location icons, each one of such location icons representing a remote site, and wherein the controller displays video information from a remote site in response to a touch command by the director of the icon representing such remote site.

24. The video conferencing system recited in claim 22 wherein the display section includes a plurality of video source icons, each one of such video source icons representing one of the plurality of video sources, and wherein the controller displays video information from one of the plurality of video sources in response to a touch command by the director of the icon representing such one of the plurality of video sources.

25. The video conferencing system recited in claim 24 wherein the video information from the plurality of video sources includes information being stored in one of slides, videotapes, documents, and computer images.

26. The video conferencing system recited in claim 25 wherein the sub-region presents a video image of the director at the local site overlaid on the video image being displayed in said sub-region, such overlaid image being produced by video camera at the local site.

27. A video conferencing system wherein a local site is networked with at least one remote site to interchange audio and video information, the local site and the at least one remote site having a video camera, a video monitor, a loudspeaker and a microphone, the local site having:
 a controller, comprising: an interconnected control panel section, video display section, and computer, for causing distribution of generated audio and video information among the sites selectively in accordance with command signals fed to the controller by a podium speaker, the controller video display section displaying video information from a selected one of a plurality of video sources, the video sources including video cameras at the remote and local sites, the controller further for causing distribution of the video information from the selected one of the video sources to the video monitors at the local and remote sites; and
 an editor, responsive to the podium speaker structured to allow the podium speaker to annotate video information on the controller video display section and then distribute the annotated information to remote sites, the editor being structured to hold the video information displayed on the controller video display section for annotation in response to a hold command and to distribute the held video information to the video monitor at the at least one remote site in response to a go live command.

28. A video conferencing system wherein a local site is networked with at least one remote site to interchange audio and video information, the at least one remote site having a video camera, a video monitor, a loudspeaker and a microphone, the local site having a video camera a loudspeaker and a microphone, such system having:

a bridge, responsive to audio signals produced by the microphones at the local and remote sites, adapted to select that one of the video signals produced by the video camera at the site corresponding to the loudest audio signal for presentation on the video monitor at the at least one remote site during a teach/direct mode; and
 a controller, at the local site, comprising: an interconnected control panel section, video display section, and computer for overriding the video signal selected by the bridge in the teach/director mode and for causing distribution of generated video information among the sites selectively in accordance with a director/teach command mode signal fed to the controller by a podium speaker.

29. A method of operating a video conferencing system wherein a local site is networked with at least one remote site to interchange audio and video information, the local site and the at least one remote site having a video camera, a video monitor, a loudspeaker and a microphone, comprising:
 providing a controller at the local site, such controller having an interconnected video display section and control section, wherein the video display section includes, in a first mode of operation, preview and presentation video display areas; and
 controlling distribution of generated audio and video information among the remote and local sites selectively in accordance with electrical signals fed to the control section in response to a tactile command from a podium speaker to the video display section, including:
 displaying in the presentation area and distributing to the video monitor at the at least one remote site video information from a first video source selected from a plurality of different video sources, including video cameras at the remote and local sites,
 displaying in the preview area video information from a second video source selected from the video sources, and
 causing, in response to a command from the podium speaker, the video information being displayed in the preview area to be distributed to the video monitor at the at least one remote site in place of the previously distributed, first mentioned video information from the first selected video source.

30. The method recited in claim 29 including providing the video display section with a video source selection area for displaying source icons representative of the plurality of different video sources and selectively coupling one, or ones, of the video sources to the video display section in response to the tactile commands to the icons.

31. The method recited in claim 29 wherein the controlling includes causing the video information being distributed to the remote sites to be distributed to a video monitor at the local site.

32. The method recited in claim 29 including transferring the video information being displayed in the preview area to the presentation area in response to a tactile command by the sodium speaker to the display section.

33. The method recited in claim 29 including editing, in a second, mark-up mode of operation, in response to podium speaker tactile commands to the video display section, the video information displayed on the video display section and controlling distribution of the edited information to the video monitors at the remote and local sites.

34. The method recited in claim 29 including providing the video display section with a video source control area for displaying control icons representative of control functions for the plurality of different video sources and including providing control signals to the plurality of different video sources in accordance with tactile commands by the podium speaker to the control area.

35. The method recited in claim 30 including providing the video display section with a site selection area for displaying site icons representative of the locations of remote sites and providing a control signal to couple video signals from a selected site to the video display section.

36. The method recited in claim 29 wherein the controller includes a zoom control and including commanding, in response to podium speaker tactile commands to the video display section identifying a portion of the video information displayed on the video display section, one of a plurality of video source cameras generating the video information on the video display section to zoom in on the identified portion.

37. The method recited in claim 36 including providing each of the preview and presentation video display areas with a corresponding video source selection area for displaying source icons representative of the plurality of different plurality of different video sources and including selectively coupling one, or ones, of the video sources to the preview and presentation display areas in response to tactile commands by the podium speaker to the corresponding video source selection area.

38. A method of operating a video conferencing system wherein a local site is networked with at least one remote site to interchange audio and video information, the at least one remote site having a video camera, a video monitor, a loudspeaker and a microphone, the local site having a video camera, a loudspeaker and a microphone, comprising:

providing, at the local site, a controller, comprising: an interconnected control panel section, video display section, and computer for distributing generated audio and video information among the local and the at least one remote sites selectively in accordance with command signals fed to the controller by a director, a display area of the controller video display section displaying video information generated by a selected one of a plurality of video sources, including video cameras at the remote and local sites, and causing distribution of the video information from the selected one of the video sources to the video monitor at the at least one remote site; and, commanding the one of the video sources generating the video information on the video display section to zoom in on a selected portion in response to a tactile command by the director on the video display section identifying the selected portion of the video information displayed on the controller video display section.

39. The method recited in claim 38 including providing the controller video display section with a preview video display area for displaying video information from a second selected one of the plurality of video sources and including, distributing such information to the video monitor at the at least one remote site in place of the previously distributed, first mentioned selected one of the plurality of video sources in response to a command from the director.

40. The method recited in claim 39 including transferring the video information from the second selected one of the plurality of video sources to the first mentioned display area in response to a transfer command from the director and distributing such transferred video source to the video monitor at the at least one remote site in place of the previously distributed, first mentioned selected one of the plurality of video sources.

41. The method recited in claim 39 including providing an editor and editing the video information displayed on the preview video display area in response to the director and distributing the edited displayed information to the video monitor at the at least one remote site when transferred to the first mentioned video display area.

42. The method recited in claim 41 including providing an editor, editing the video information displayed on the controller video display section in response to the director, and distributing the edited displayed information to the video monitor at the at least one remote site.

43. The method recited in claim 38 including providing an editor and editing the video information displayed on the controller video display section in response to the director and distributing the edited information to the video monitor at the at least one remote site.

44. A method of operating a video conferencing system wherein a local site is networked with at least one remote site to interchange audio and video information, the local site and the at least one remote site having a video camera, a video monitor, a loudspeaker and a microphone, comprising:

providing a controller, comprising: an interconnected control panel section, computer and video display section, the video display section including a plurality of different display regions;

distributing audio and video information among the local and remote sites selectively in accordance with command signals fed to the controller by a director, including:

displaying presentation video information from a selected one of a plurality of video sources, including video cameras at the remote and local sites, on one of said display regions of the controller video display section;

causing distribution of the presentation video information from the selected one of the video sources to the video monitors at the local and remote sites;

displaying preview video information from a second selected one of the plurality of video sources on another of said display regions of the controller video display section; and, causing the preview video information to replace the presentation video information on the video monitors at the local and remote sites and on the first mentioned display region upon receipt of a selected command signal from the director.

45. The method recited in claim 44 including providing an editor, editing the video information displayed on the controller video display section in response to editing signals fed to the controller by the director, and distributing the edited displayed information to the video monitors at the remote and local sites.

46. The method recited in claim 44 including providing a video display from a selected one of the plurality of video sources in a sub-region within the first mentioned region of the display section, and distributing the video displayed in such first mentioned display section with the sub-region to the video display monitors at the local and remote sites.

47. The method recited in claim 46 including transferring, in response to a director command, the video information displayed at the second one of the display regions to the first one of the display regions.

48. The method recited in claim 47 including providing the display section with a touch screen adapted to respond to commands resulting from director contact with the screen.

49. The method recited in claim 48 including providing the display section with a plurality of location icons, each one of such location icons representing a remote site, and displaying the video information from a remote site in response to a touch command by the director of the icon, representing such remote site.

50. The method recited in claim 48 including providing the display section with a plurality of video source icons, each one of such video source icons representing one of the plurality of video sources, and displaying video information from one of the plurality of video sources in response to a touch command by the director of the icon representing such one of the plurality of video sources.

51. The method recited in claim 50 including providing video information from one of slides, videotapes, documents, and computer images from one of the plurality of video sources.

52. The method recited in claim 51 including presenting in the sub-region a video image of the presenter at the local site overlaid on the video image being displayed in said sub-region, and producing such overlaid image by a video camera at the local site.

53. A method of operating a video conferencing system wherein a local site is networked with at least one remote site to interchange audio and video information, the local site and the at least one remote site having a video camera, a video monitor, a loudspeaker and a microphone, comprising:

providing a controller at the local site, comprising: an interconnected control panel section, video display section, and computer, for causing distribution of generated audio and video information among the local and remote sites selectively in accordance with command signals fed to the controller by a podium speaker;

displaying video information from a selected one of a plurality of video sources, the video sources including video cameras at the remote and local sites, on the controller video display section; and causing distribution of the selected one of the video sources to the video monitors at the local and remote sites; and, editing the video information displayed on the controller video display section with an editor responsive to editing commands fed to the editor by the podium speaker, including holding the video information displayed on the controller video display section for annotation in response to a hold command and distributing the held video information to the video monitor at the at least one remote site in response to a go live command.

54. A method of operating a video conferencing system wherein a local site is networked with at least one remote site to interchange audio and video information, the at least one remote site having a video camera, a video monitor, a loudspeaker and a microphone, the local site having a video camera, a loudspeaker and a microphone, comprising:

providing a bridge, responsive to audio signals produced by the microphones at the local and remote sites, adapted to select that one of the video signals produced by the video camera at the site corresponding to the loudest audio signal for presentation on the video monitors at the local and remote sites during a teach/direct mode; and providing a controller, at the local site, comprising: an interconnected control panel section, video display section, and computer for overriding the video signal selected by the bridge in the teach/director mode and for causing distribution of generated video information among the local and remote sites selectively in accordance with a director/teach command mode signal fed to the controller by a podium speaker.

55. A video conferencing system wherein a local site is networked with at least one remote site to interchange audio and video information, the local site and the at least one remote site having a video camera, a video monitor, a loudspeaker and a microphone, the local site having:

a controller, comprising a video display section being interconnected with a control section, for controlling distribution of generated audio and video information among the local and remote sites selectively in accordance with electrical signals fed to the control section in response to a tactile command from a podium speaker to the video display section, the control section comprising:

a video selector having a plurality of input ports and a plurality of output ports, for coupling a selected one, or ones, of the input ports to a selected one, or ones, of the output ports in accordance with a control signal, and;

a computer for producing the control signal in response to the tactile command a picture in picture unit having a pair of input ports and an output port, a first one of the pair of input ports of the unit being coupled to the computer, a second one of the pair of input ports of the unit being coupled to one of the output ports of the selector and the output port of the unit being coupled to one of the input ports of the video selector.

56. The video conferencing system recited in claim 55 including a picture in picture unit having a pair of input ports and an output port, a first one of the pair of input ports of the unit being coupled to the computer, a second one of the pair of input ports of the unit being coupled to one of the output ports of the selector and the output port of the unit being coupled to one of the input ports of the video selector.

57. The video conferencing system recited in claim 55 wherein the computer includes a graphics card having an input coupled to one of the output ports of the video selectors an output port coupled to the first one of the pair of input ports of the picture in picture unit, and an output port coupled to one of the input ports of the video selector.

58. The video conferencing system recited in claim 57 wherein the computer includes a disk drive coupled to the graphics card.

59. The video conferencing system recited in claim 58 wherein the computer includes a video section having an output coupled to the video display section.

60. The video conferencing system recited in claim 59 wherein the video section includes a pair of video capture/display cards and a VGA video card.

61. The video conferencing system recited in claim 60 wherein each one of the pair of video display/capture cards has a pair of inputs and an output, and wherein the VGA graphics card has an input coupled to the computer and an output coupled to a first one of the pair of video display/capture cards, a second one of the pair of inputs of the first one of the pair of video display/capture cards being coupled to one of the output ports of the video selector, and wherein the output port of the first one of the pair of video display/capture cards is coupled to one of the pair of input ports of the second one of the pair of video display/capture cards, the output of the second one of the pair of video display/capture cards being coupled to the video display section.

62. The video conferencing system recited in claim 61 wherein the VGA card produces a first color in one region of a video display of the video display region and a second color in a different region of the display, and wherein the first one of the pair of video display/capture cards writes in the first one of the regions and the second one of the pair of video display/capture cards writes video in the second one of the display regions.

63. A video conferencing system wherein a local site is networked with at least one remote site to interchange audio and video information, the local site and the at least one remote site having a video camera, a video monitor, a loudspeaker and a microphone, the local site having:
- a controller, comprising a video display section being interconnected with a control section, for controlling distribution of generated audio and video information among the local and remote sites selectively in accordance with electrical signals fed to the control section in response to a tactile command from a podium speaker to the video display section, the control section comprising:
  - a video selector having a plurality of input ports and a plurality of output ports, for coupling a selected one, or ones, of the input ports to a selected one, or ones, of the output ports in accordance with a control signal, and;
  - a computer for producing the control signal in response to the tactile command, the computer having a video section having an output coupled to the video display section, wherein the video section of the computer includes a pair of video capture/display cards and a VGA video card.

64. The video conferencing system recited in claim 63 wherein each one of the pair of video display/capture cards has a pair of inputs and an output, and wherein the VGA graphics card has an input coupled to the computer and an output coupled to a first one of the pair of video display/capture cards, a second one of the pair of inputs of the first one of the pair of video display/capture cards being coupled to one of the output ports of the selector, and wherein the output port of the first one of the pair of video display/capture cards is coupled to one of the pair of input ports of the second one of the pair of video display/capture cards, the output of the second one of the pair of video display/capture cards being coupled to the video display section.

65. The video conferencing system recited in claim 64 wherein the VGA card produces a first color in one region of a video display of the video display region and a second color in a different region of the display, and wherein the first one of the pair of video display/capture cards writes in the first one of the regions and the second one of the pair of video display/capture cards writes video in the second one of the display regions.

66. A method of operating a video conferencing system wherein a local site is networked with at least one remote site to interchange audio and video information, the at least one remote site having a video camera, a video monitor, a loudspeaker and a microphone, the local site having a video cameras, a loudspeaker and a microphone, comprising:
- providing, at the local site, a controller, comprising: an interconnected video display section and control section, for controlling distribution of generated audio and video information among the local and remote sites selectively in accordance with electrical signals fed to the control section in response to a tactile command from a podium speaker to the video display section; and
- operating the controller in a "Round Robin" mode to automatically couple video information generated from each one of the local and remote sites to the video display section, including displaying on the controller video display section video information from each of the local and remote sites in sequence after a specified amount of time.

67. A video conferencing system wherein a local site is networked with at least one remote site to interchange audio and video information, the at least one remote site having a video camera, a video monitor, a loudspeaker and a microphone, the local site having a video camera, a loudspeaker and a microphone, and further having:
- a controller, comprising: an interconnected video display section and control section, for controlling distribution of generated audio and video information among the local and remote sites selectively in accordance with electrical signals fed to the control section in response to a tactile command from a podium speaker to the video display section, the controller video display section displaying video information from a selected one of a plurality of video sources including video cameras at the remote and local sites, wherein in a mark-up mode of operation, the control section edits the video information displayed on the controller video display section in response to a command from the podium speaker such that the video information displayed on the controller video display section is held for annotation in response to a hold command and the held video information is distributed to the video monitor at the at least one remote site in response to a go live command.

* * * * *